United States Patent [19]

Tahata et al.

[11] Patent Number: 4,648,811

[45] Date of Patent: Mar. 10, 1987

[54] CLOSED TYPE COMPRESSOR

[75] Inventors: Masahiro Tahata, Fuji; Hirokazu Washizu, Shizuoka, both of Japan

[73] Assignee: Kabushiki Kaisha Toshiba, Kawasaki, Japan

[21] Appl. No.: 776,796

[22] Filed: Sep. 17, 1985

[30] Foreign Application Priority Data

Sep. 27, 1984 [JP] Japan .............................. 59-202743

[51] Int. Cl.[4] ............................................ F04B 39/12
[52] U.S. Cl. ................................. 417/410; 417/902; 219/117.1
[58] Field of Search ............... 417/901, 410; 285/192, 285/173, 189; 219/85 CM, 47.1

[56] References Cited

U.S. PATENT DOCUMENTS

| 2,137,097 | 11/1938 | Sateren | 285/173 |
| 2,846,241 | 8/1958 | McDonnell et al. | 285/192 |
| 3,209,991 | 10/1965 | Sauber | 417/902 X |
| 4,487,555 | 12/1984 | Ohinata et al. | 417/902 X |

FOREIGN PATENT DOCUMENTS

| 57-176388 | 10/1982 | Japan | 417/902 |
| 1194182 | 6/1970 | United Kingdom | 285/189 |

Primary Examiner—Carlton R. Croyle
Assistant Examiner—Theodore W. Olds
Attorney, Agent, or Firm—Oblon, Fisher, Spivak, McClelland & Maier

[57] ABSTRACT

A closed type compressor having a closed casing, a compressor unit, and a motor enclosed in the casing together with the compressor unit. A copper pipe is mounted to the casing through a steel pipe joint for inducing or discharging a coolant to or from the compressor. The casing is comprised of a steel cylindrical wall which has an elliptical aperture in its wall, a top end wall, and a bottom end wall respectively closing the top and the bottom end openings of the cylindrical side wall. The pipe joint has a conical outer surface capable of meeting with the ellliptical aperture wall defining the elliptical aperture in the cylindrical side wall without leaving any gap between them. The pipe joint is coupled to the elliptical aperture wall of the cylindrical side wall by resistance welding.

4 Claims, 7 Drawing Figures

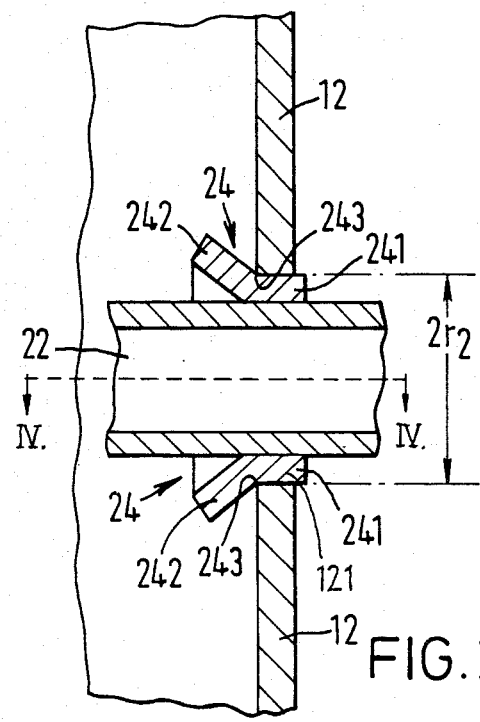
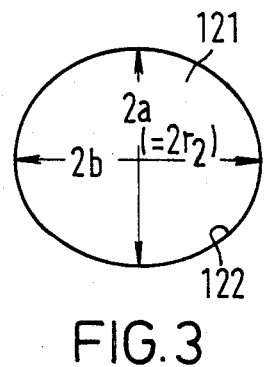
FIG. 2
FIG. 3
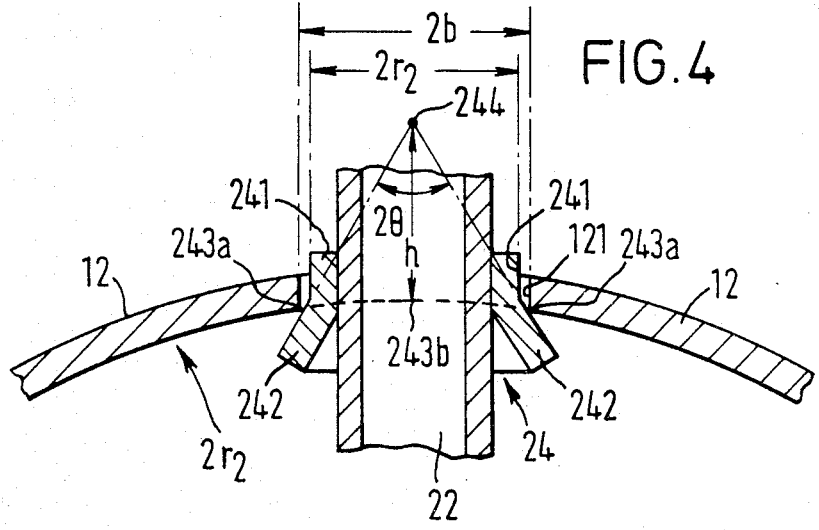
FIG. 4

CLOSED TYPE COMPRESSOR

BACKGROUND OF THE INVENTION

1. Field of the Invention

The present invention relates generally to a closed type compressor for use in cooling, refrigeration or air-conditioning and, more particularly to, a closed type compressor which has an improved structure for coupling a refrigerant inducing or discharging pipe means to a cylindrical casing of the compressor.

2. Description of the Prior Art

A closed type compressor is constructed such that a compressor unit and an electric motor are housed in a hermetic casing. The closed type compressor is equipped with pipe means respectively for inducing or discharging refrigerants or coolants to or from foreign devices, e.g., evaporaters. The casing of the compressor has generally a cylindrical side wall, and at least one of the inducing pipe and the discharging pipe is often needed to be coupled to the compressor unit through the cylindrical side wall of the casing.

Usually, the casing is made of steel, while the pipes are made of copper. A coupling of the copper pipe to the steel casing has been made with an aid of a pipe joint made of steel from matters of a welding and a mechanical strength between them. The pipe joint comprises a cylinder portion whose inside wall fits well the outside wall of the copper pipe and a tapered flare portion extending from one end of the cylinder portion. The pipe joint is attached to the cylindrical side wall by fitting its cylinder portion into a circular aperture defined in the cylindrical side wall of the casing from inside thereof and engaging the flare portion with an aperture wall, defining the circular aperture, of the side wall. The pipe joint is then gas-welded to the cylindrical side wall around the aperture wall by a resistance welding. The pipe is soldered to the inside wall of the cylinder portion of the pipe joint with soldering brass or soldering copper.

The conventional closed type compressor had a drawback that the welding of the pipe joint to the cylindrical side wall of the casing often left some unwelded gaps between them. This was due to the fact that the tapered flare portion of the pipe joint is unable to contact to all the circular aperture wall perpendicularly of the cylindrical side wall of the casing, due to the fact that the side wall of the casing is cylindrical while the flare portion of the pipe joint is conical. Therefore there are left some unwelded sections as gaps between the circular aperture wall and the flare portion of the pipe joint. The gaps left unwelded reduce the hermeticity of the casing so as to cause a leakage of the coolant. Furthermore, the unwelded portions reduced the mechanical strength of the coupling portion between the casing and the pipe joint.

The resistance welding or a ring projection welding is practiced by flowing an electric current to a resistive contact portion between members to be welded together. The current flowing in the resistive contact generates a large quantity of heat which melts the contact portion. The heat quantity Q in the resistance welding is given by the following equation:

$$Q = 0.24 \cdot I^2 \cdot R \cdot t$$

where I is the current, R is the resistance at the contact portion including internal resistances of both members to be welded together, and t is the time the current flows.

The above described resistance welding is practiced for the contact portion between the casing and the pipe joint by pressing electrodes of a resistance welding machine against the casing and the pipe.

The resistance welding has a feature that the welding is easily applied in an automated manufacturing process so that the manufacturing cost is reduced. However, the resistance welding has a drawback that the welding is limited in its application by the requirement of a matching state between the shapes of the members to be welded together. To comply with the drawback in the field of manufacturing a closed type compressor, some methods have been conventionally used for ensuring a sufficient contact between the pipe joint and the casing. In one method, for example, the cylindrical side wall has been reshaped to a flat condition at its portion around the aperture for receiving a pipe joint. In another method, the cylindrical side wall has been burred at its portion around the aperture wall so as to produce a portion shaped to match the conical flare of the pipe joint. However, the conventional methods have still borne a drawback that the process of flattening or burring is added in the manufacturing process to cause an increasing of costs for manufacturing the closed type compressor.

There has been a further conventional method for coupling a pipe to a cylindrical side wall of a compressor casing. In that method, the pipe is fit into an aperture for receiving the pipe without using a pipe joint, and then gas-welded directly to an aperture wall with soldering silver. However, this method has still had some drawbacks. The gas-welding with soldering silver is not only very expensive in comparison to the total of costs for the resistance welding and a pipe joint, but also the soldering silver is more expensive than the soldering copper or the soldering brass. The gas-welding of the pipe directly to the aperture wall with the soldering has of course a drawback that the gas-welding is difficult to apply in the automated manufacturing process as aforementioned.

OBJECTS OF THE INVENTION

It is an object of the present invention to provide a closed type compressor in which a pipe for inducing or discharging a coolant of a refrigerant is securely coupled to a cylindrical side wall of a casing of the compressor without harming the hermeticity of the casing.

It is another object of the present invention to provide a closed type compressor which is able to be easily manufactured in an automated process without increasing processes and costs of manufacturing.

SUMMARY OF THE INVENTION

According to one aspect of the present invention, the closed type compressor has a hermetic casing, a compressor unit housed in the casing, an electric motor housed in the casing together with the compressor unit for driving the compressor unit, and a copper pipe mounted to the casing through a pipe joint for inducing or discharging a coolant or a refrigerant to or from the compressor. The casing is comprised of a steel cylindrical side wall which defines an elliptical aperture for receiving the pipe joint and a top end and a bottom end walls respectively closing a top and a bottom end openings of the cylindrical side wall. The pipe joint has a conical outer surface with a predetermined conical angle so as to be able to contact with the elliptical aperture wall of the cylindrical side wall without leaving any gaps between them so that the pipe joint is welded to the elliptical aperture wall of the cylindrical side wall in securing hermeticity of the casing.

Additional objects, advantages, and features of the present invention will further become apparent to persons skilled in the art from a study of the following description and of the accompanying drawings, in which:

BRIEF DESCRIPTION OF THE DRAWINGS

FIG. 2 is an enlarged section showing a part of FIG. 1;

FIG. 3 is a flat projection of an aperture 121 in FIG. 2;

FIG. 4 is a section taking along the line IV—IV of FIG. 2;

DESCRIPTION OF THE PREFERRED EMBODIMENTS

Figure 1:
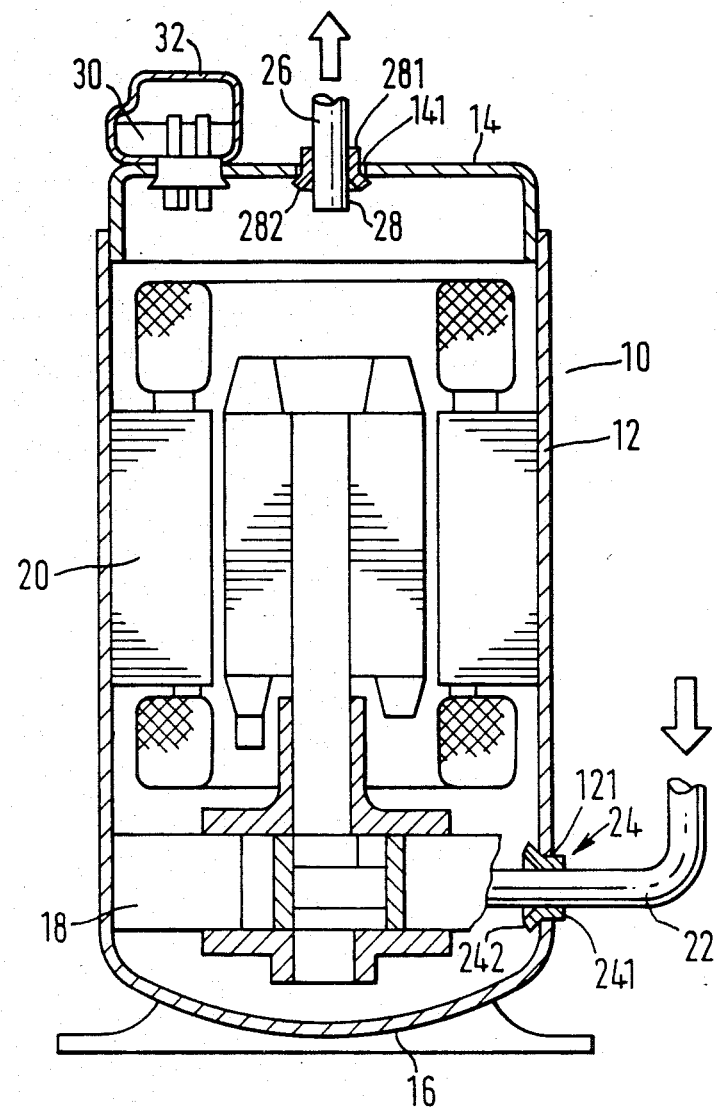
FIG. 1 is a cross section showing an embodiment of a closed type compressor according to the present invention.

The present invention will now be described in detail with reference to the accompanying drawings, namely, FIGS. 1 to 7. Throughout the drawings, like reference numerals and letters are used to designate like or equivalent elements for the sake of simplicity of explanation.

Referring now to FIG. 1, there is shown an embodiment of a closed type compressor according to the present invention. In the drawing, a casing 10 is comprised of a cylindrical side wall 12 made of steel, a flat top end wall 14 made also of steel attached hermetically to the top end of the cylindrical side wall 12 for closing the top end thereof and a spherical bottom end wall 16 formed in one piece with the cylindrical side wall 12 for closing the bottom end of the cylindrical side wall 12. The casing 10 houses hermetically a compressor unit 18 and an electric motor 20 for driving the compressor unit 18. An elliptical aperture 121 is formed in the cylindrical side wall 12 of the casing 10. As shown in FIGS. 3, the elliptical aperture 121 has an aperture wall 122 extending through the cylindrical side wall 12. The elliptical aperture 121 receives a pipe made of copper, e.g., a coolant inducing pipe 22 made of copper through a pipe joint 24 made of steel. Further, the flat top end wall 14 contains a circular aperture 141. The circular aperture 141 receives another pipe made of copper, e.g., a coolant discharging pipe 26 through another pipe joint 28 made also of steel. The pipe joints 24 and 28 are respectively applied to the walls of the apertures 121 and 141 on the inside of the casing 10 and then welded to the cylindrical side wall 12 and the flat top end wall 14 by the resistance welding method as aforementioned. The coolant inducing pipe 22 and the coolant discharging pipe 26 are respectively fit into the pipe joints 24 and 28 and then gas-welded thereto with soldering copper or soldering brass.

The pipe joints 24 and 28 are shaped into funnel-like shapes comprised respectively of cylindrical portions 241, 281 and tapered or conically flared portions 242, 282 extending from respective one ends of the cylindrical portions 241, 281. Respective outer conical surfaces of the conically flared portions 242, 282 are welded to the cylindrical side wall 12 and the flat top end wall 14 around the apertures 121, 141, respectively. The coolant inducing pipe 22 and the coolant discharging pipe 26 are respectively fit into the cylindrical portions 241 and 281 of the pipe joints 24 and 28, and then the coolant inducing pipe 22 and the coolant discharging pipe 26 are gas-welded to the cylindrical portions 241, 281, respectively with soldering copper or soldering brass.

The top end wall 14 of the casing 10 mounts hermetically a terminal block 30 for supplying electric power to the electric motor 20. The portion of the terminal block 30 outside the casing 10 is covered by a terminal box 32.

Referring now to FIG. 2, there is shown a part of the closed type compressor in section where the coolant inducing pipe 22 is mounted in the elliptical aperture 121 in the cylindrical side wall 12. The major axis of the elliptical aperture 121 is perpendicular to the axis of the cylindrical side wall 12, and the minor axis of the elliptical aperture 121 is parallel to the axis of the cylindrical side wall 12. The minor axis is dimensioned in correspondence to the outside diameter of the cylindrical portion 241 of the pipe joint 24, so that the cylindrical portion 241 of the pipe joint 24 fits to the aperture wall 122 of the elliptical aperture 121 along two lines (shown in FIG. 2) perpendicular to and through the ends of the minor axis. The major axis is dimensioned as a function of the dimensions of the inside diameter of the cylindrical side wall 12, the conical angle of the conically flared portion 242 of the pipe joint 24, and the length of the minor axis of the elliptical aperture 121 as described later. A plan view of the elliptical aperture 121 is shown in FIG. 3.

Referring back to FIG. 2, the cylindrical portion 241 of the pipe joint 24 is inserted into the elliptical aperture 121 from inside of the casing 10, so as to fit its outside surface to the two wall portions of the aperture wall 122 corresponding to the minor axis of the elliptical aperture 121, until the boundary 243 of the cylindrical portion 241 and the conically flared portion 242 of the pipe joint 24 engages the inside edges of the aperture wall 122 at two points at the opposite ends of the minor axis of the elliptical aperture 121.

Referring now to FIG. 4, which is a cross section taken along the line IV—IV of FIG. 2, a set of inside edges of the aperture wall 122 along the major axis of the elliptical aperture 121 engage with the outer surface of the conically flared portion 242 at portions separated a little from the boundary 243.

Figure 5:
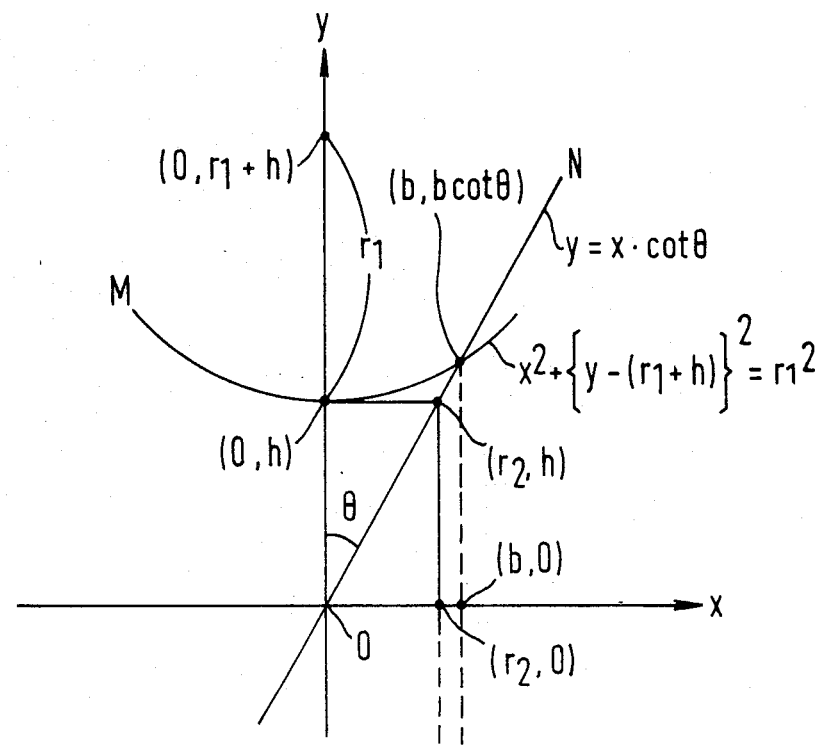
FIG. 5 is a diagramatical view showing the relation among the cylindrical side wall 12, the pipe joint 24, and the aperture 121 in FIG. 4.

Referring now to FIGS. 4 and 5, the dimensions of the elliptical aperture 121, the major axis and the minor axis of which are designed according to the inside diameter of the cylindrical side wall 12, the outside diameter of the cylindrical portion 241 of the pipe joint 24, and the conical angle of the conically flared portion 242 of the pipe joint 24, will be explained hereinafter in detail. Here the dimensions of the minor and major axes are presented as $2a$ and $2b$ as shown in FIG. 3. The dimensions of the inside diameter of the cylindrical side wall 12, the outside diameter of the cylindrical portion 241, and the conical angle of the conically flared portion 242 of the pipe joint 24 are presented respectively as $2r_1$, $2r_2$, and $2\theta$.

The minor axis 2a is given as $2r_2$, since the minor axis is designed so as that the minor axis is set to unite with the outside diameter $2r_2$ of the cylindrical portion 241 of the pipe joint 24 for the reason already mentioned above.

FIG. 5 shows a view for diagramatically presenting the relation among the dimensions $r_1$, $r_2$, and r and the shape of the elliptical aperture 121. In the drawing, an arc graph M represents a part of the internal wall of the cylindrical side wall 12, while a rectilinear graph N represents a ridgeline of the conically flared portion 242 of the pipe joint 24. The origin O of the coordinate system is the imaginary vertex 244 (shown in FIG. 4) of the conically flared portion 242 of the pipe joint 24. The rectiliner graph N passes through the origin O and diverges from the Y coordinate by the angle $\theta$. The center of the arc graph M has the coordinates (O, $r_1+h$), where h represents the height of the imaginary vertex 244 from an imaginary plane defined by the boundary 243 of the pipe joint 24. As will be apparent, the dimension h is given by the equation $h=r_2 \cdot \cot\theta$.

In FIG. 5, the equation of the arc graph M is as follows;

$$x^2+\{y-(r_1+h)\}^2=r_1^2 \quad (1)$$

while the equation of the rectiliner graph N is given as follows;

$$y=x \cdot \cot\theta \quad (2)$$

A second, symmetrical rectiliner graph (not shown) would, of course, define the contact point at the other end of the major axis of the elliptical aperture 121. The intersections of the arc graph M, the rectiliner graph N, and the second, symmetrical rectiliner graph define the two point contacts where the inside edge of the aperture wall 122 at each end of the major axis of the elliptical aperture 121 meets with the outer surface of the conically flared portion 242 of the pipe joint 24. The equation (1) may be transformed as follows by substituting the $x \cot \theta$ of the equation (2) for the y of the equation (1);

$$x^2+(x \cot\theta-(r_1+r_2 \cdot \cot\theta))^2=r_1^2 \quad (3)$$

That is, the dimension 2b of the major axis of the elliptical aperture 121 is given as two times 2x of the solution x for the equation (3). The solution 2x is given as follows:

$$2x = \frac{2\cot\theta(r_1 + r_2\cot\theta) - \sqrt{K}}{1 + \cot^2\theta} \quad (4)$$

where $K=4 \cot^2 \theta(r_1+r_2 \cot^2 \theta)^2 - 4(1+\cot^2 \theta)(2r_1 r_2 \cot \theta + r_2^2 \cot^2 \theta)$.

Provided the angle $2\theta$ is 60°, i.e., $2\theta=60°$, the equation (4) is simplified as follows;

$$2x = \frac{\sqrt{3}(r_1 + \sqrt{3} r_2) - \sqrt{3r_1^2 - 2\sqrt{3} r_1 r_2 - 3r_2^2}}{2} \quad (5)$$

From the equation (4), an actual dimension of the major axis 2b is obtained by setting the dimensions $r_1$ and $r_2$ to respective prescribed values. The following table shows some exemplary values of the dimensions $r_1$ and $r_2$ and the corresponding actual dimensions 2b.

| | ($2\theta = 60°$) | |
|---|---|---|
| $2r_1$ (mm) | $2r_2$ (mm) | 2b (mm) |
| 123.41 | 15.9 | 16.55 |
| | 19.1 | 20.05 |
| | 22.2 | 23.51 |
| 110.35 | 15.9 | 16.63 |
| | 19.1 | 20.17 |
| | 22.2 | 23.68 |

The major axis 2b for any values of the other dimensions (i.e., $2r_1$, $2r_2$, and $2\theta$) can be, of course, obtained from the general formula (4) concerning the solution 2x.

According to the above structure of the compressor, the curvature of the aperture wall 122 of the elliptical aperture 121 is calculated to meet with the outer surface of the conically flared portion 242 so that the aperture wall 122 is able to securely contact the outer surface of the conically flared portion 242 of the pipe joint 24 along two lines that are parallel to the two lines where the cylindrical portion 241 contacts the aperture wall 122. Therefore, the aperture wall 122 in the cylindrical side wall 12, the conically flared portion 242 of the pipe joint 24 and the cylindrical portion 241 are able to be securely welded along those four lines by the resistance welding as aforementioned. Furthermore, the welded portion is saved from the defect of the gas leaking due to the air gaps.

In the above embodiment, the closed type compressor of the present invention does not require any further manufacturing process like the flattening or the burring of the cylindrical side wall around the aperture wall which are needed in the conventional process. Moreover, the coupling of the pipe joint to the cylindrical side wall also does not require expensive gas welding with soldering silver. Accordingly, the closed type compressor of the present invention is able to be manufactured without inviting increasings of costs and processes for manufacturing.

The same result is also obtained if the pipe joint 24 is coupled outside the cylindrical side wall 12, instead of the above embodiment in which the pipe joint 24 is coupled inside the cylindrical side wall 12. In this case, however, the elliptical aperture 121 has to be directed so that the major axis of the elliptical aperture 121 is parallel to the the axis of the cylindrical side wall 12 of the casing 10 and the minor axis is perpendicular to the axis of the cylindrical side wall 12.

Figure 6:
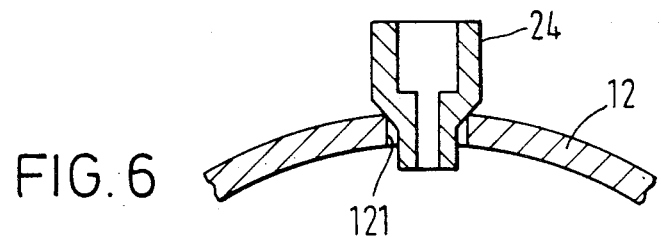
FIG. 6 is a section showing a modification of the pipe joint.
Figure 7:
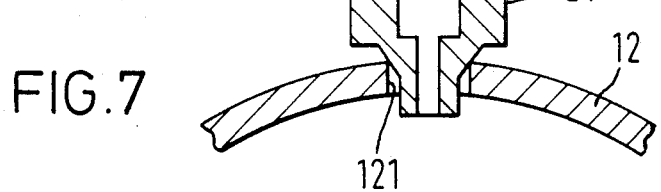
FIG. 7 is a section showing another modification of the pipe joint.

Further, the pipe joint 23 is not limited to the shape of the above embodiment. For example, the pipe joints 24 as shown in FIGS. 6 and 7 are able to used. Furthermore, it is to be understood that the invention is not restricted to the embodiments described above and shown, and that various modifications and changes may be made therein without departing from the spirit and scope of the present invention.

As described above, the present invention may provide a closed type compressor in which a pipe joint is coupled securely to the cylindrical side wall of the casing without inviting any gas leaking and an increasing of costs for manufacturing thereof, by shaping the aperture for receiving the pipe joint to the cylindrical side wall in an elliptical figure.

What is claimed is:
1. A closed type compressor comprising:

(a) a casing having a cylindrical side wall which has a top and bottom ends, a top end wall, and a bottom end wall, said cylindrical side wall having an elliptical aperture therein defined by an elliptical aperture wall, said elliptical aperture being elliptical in flat projection, and said top and bottom end walls closing the top end and bottom end of said cylindrical side wall, respectively;

(b) a compressor unit provided in said casing;

(c) an electric motor for driving said compressor unit, said electric motor being provided in said casing together with said compressor unit;

(d) a pipe joint mounted in said elliptical aperture in said cylindrical side wall, said pipe joint having a conical outer surface with a predetermined conical angle, the dimensions of said elliptical aperture being calculated so that said conical outer surface of said pipe joint meets said elliptical aperture wall without any gap between said conical outer surface and said elliptical aperture wall, whereby said cylindrical side wall and said pipe joint can be joined together by resistance welding; and (e) a pipe for inducing or discharging gas to or from said compressor, said pipe being coupled to said pipe joint.

2. A closed type compressor according to claim 1, wherein said cylindrical side wall and said pipe joint are made of steel and copper, respectively.

3. A closed type compressor according to claim 1, wherein:

(a) said pipe joint comprises a cylindrical portion and a flared conical portion extending from one end of said cylindrical portion;

(b) said cylindrical portion and said flared conical portion meet in a circular boundary; and (c) said conical outer surface is the outer surface of said flared conical portion.

4. A closed type compressor according to claim 4, wherein:

(a) said elliptical aperture has a major axis and a minor axis;

(b) said cylindrical side wall has an axis;

(c) the minor axis of said elliptical aperture is parallel to the axis of said cylindrical side wall;

(d) the major axis of said elliptical aperture is perpendicular to the axis of said cylindrical side wall;

(e) the length of the minor axis of said elliptical aperture is at least substantially equal to the outside diameter of said cylindrical portion of said pipe joint, whereby said elliptical aperture wall abuts said circular boundary at two points at the opposite ends of the minor axis of said elliptical aperture; and (f) said flared conical portion abuts said elliptical aperture wall along a curve leading from the opposite ends of the minor axis of said elliptical aperture to the opposite ends of the major axis of said elliptical aperture and back to the opposite ends of the minor axis of said elliptical aperture.

* * * * *